(12) United States Patent
Jenkins et al.

(10) Patent No.: US 12,481,341 B2
(45) Date of Patent: Nov. 25, 2025

(54) DISTRIBUTED PHASE REDUNDANCY

(71) Applicant: International Business Machines Corporation, Armonk, NY (US)

(72) Inventors: Luke L. Jenkins, Poughkeepsie, NY (US); John S. Werner, Fishkill, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 18/485,052

(22) Filed: Oct. 11, 2023

(65) Prior Publication Data

US 2025/0123666 A1 Apr. 17, 2025

(51) Int. Cl.
G06F 1/28 (2006.01)
G06F 3/06 (2006.01)
G06F 11/07 (2006.01)

(52) U.S. Cl.
CPC .............. G06F 1/28 (2013.01); G06F 3/0635 (2013.01); G06F 11/0727 (2013.01)

(58) Field of Classification Search
CPC ....... G06F 1/28; G06F 3/0635; G06F 11/0727
See application file for complete search history.

(56) References Cited

U.S. PATENT DOCUMENTS

| | | | | |
|---|---|---|---|---|
| 6,038,633 A | * | 3/2000 | Tavallaei | G06F 13/24 |
| | | | | 710/262 |
| 7,301,313 B1 | * | 11/2007 | Hart | G06F 1/263 |
| | | | | 323/269 |
| 9,143,392 B2 | | 9/2015 | Duchesneau | |
| 9,588,559 B2 | * | 3/2017 | Venishetti | G06F 1/263 |
| 10,719,530 B2 | | 7/2020 | Certain et al. | |
| 11,444,791 B2 | | 9/2022 | Jones et al. | |
| 11,656,676 B2 | * | 5/2023 | Kuehnis | G06F 9/5094 |
| | | | | 327/540 |
| 2008/0093933 A1 | * | 4/2008 | Pracht | H05K 1/0262 |
| | | | | 307/116 |
| 2012/0049819 A1 | * | 3/2012 | Mao | H02J 1/001 |
| | | | | 323/234 |
| 2014/0317315 A1 | | 10/2014 | Duchesneau | |
| 2015/0177798 A1 | * | 6/2015 | Venishetti | G06F 1/263 |
| | | | | 713/300 |
| 2016/0210343 A1 | | 7/2016 | Certain et al. | |
| 2020/0389329 A1 | | 12/2020 | Jones et al. | |

(Continued)

OTHER PUBLICATIONS

"Hot-Swap N+1 Redundant XPhase® Controller for High-Reliability DC/DC," International Rectifier, Year: 2021, pp. 1-2.

(Continued)

*Primary Examiner* — Zahid Choudhury
(74) *Attorney, Agent, or Firm* — Patterson + Sheridan, LLP

(57) ABSTRACT

Embodiments herein describe a switchable redundant voltage regulator (referred to herein as a redundant phase) that can be attached to multiple different power domains. Instead of providing a redundant phase for every load or voltage domain in a computing system, the embodiments herein describe sharing redundant phases between voltage domains. Thus, if a primary phase serving any one of the phase fails, the switch can be controlled to connect the redundant phase to the corresponding voltage domain. In this manner, the redundant phase is a shared phase for a plurality of voltage domains.

20 Claims, 5 Drawing Sheets

(56) References Cited

U.S. PATENT DOCUMENTS

| | | |
|---|---|---|
| 2021/0167814 A1 | 6/2021 | Arduini et al. |
| 2022/0006868 A1 | 1/2022 | Császár et al. |
| 2022/0124159 A1 | 4/2022 | Nagy et al. |
| 2023/0018828 A1* | 1/2023 | Bassin .................. G06F 9/4887 |

OTHER PUBLICATIONS

"A Method of Multiple Control Modules (or Masters) in a redundant fashion for phase redundancy using a Median detector," ip.com, IP.com No. IPCOM000255371D, Dated: Sep. 20, 2018, pp. 1-6.

"Redundant Phase Doubler Circuit for VRMs," ip.com, IP.com No. IPCOM000266976D, Dated: Sep. 9, 2021, pp. 1-4.

Andrew Bruce, "Creating failure tolerance with redundancy in 24 V DC systems," White Paper, Phoenix Contact, Dated: Jan. 2021, pp. 1-7.

Ed Spears, "Parallel UPS systems: Connecting multiple UPS modules for added capacity or redundancy," Eaton Power Quality Solutions Operation, Year: 2020, pp. 1-6.

X. Yu, "Current Sharing in Redundant Systems," Texas Instruments, Application Report, Dated: Mar. 2010, pp. 1-9.

\* cited by examiner

DISTRIBUTED PHASE REDUNDANCY

BACKGROUND

The present invention relates to redundant voltage regulators.

The number of processors in computing systems is growing rapidly. With diminishing returns from Moore's Law, compute providers have used new methods of gaining system compute performance. One solution is to use more, smaller processor chips, which also benefit processor yields. For example, many processor drawers have multiple processors (e.g., four or more) where each processor requires its own core voltage.

Power delivery becomes a more challenging problem as the number of processors in a processor drawer increases. Maintaining redundancy poses particular challenges with regards to space and routing. That is, maintaining N+1 or N+2 redundancy becomes more difficult as more processors are added in the same amount of space as each processor drives more core voltage domains, each requiring their own redundancy phases.

SUMMARY

According to one embodiment of the present invention, a system includes a plurality of primary voltage regulators coupled to respective loads, a plurality of redundant voltage regulators coupled to respective switches where each of the switches is coupled to a plurality of the respective loads, and a controller. The controller is configured to detect a failure of one of the plurality of primary voltage regulators, identify a load powered by the failed voltage regulator, and control one of the respective switches to couple a corresponding one of the plurality of redundant voltage regulators to the identified load.

According to one embodiment of the present invention, a method includes detecting a failure of one of a plurality of primary voltage regulators where the plurality of primary voltage regulators are coupled to respective loads, identifying a load powered by the failed voltage regulator, and controlling a switch to couple a redundant voltage regulator to the identified load.

According to one embodiment of the present invention, a PCB that includes a plurality of primary voltage regulators configured to provide power to a plurality of loads, a plurality of redundant voltage regulators coupled to respective switches where each of the respective switches are configured to couple to the plurality of the loads, and a controller. The controller is configured to detect a failure of one of the plurality of primary voltage regulators, identify a load powered by the failed voltage regulator, and control one of the respective switches to couple a corresponding one of the plurality of redundant voltage to the identified load.

DETAILED DESCRIPTION

Figure 1:
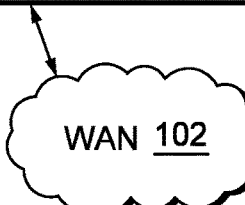
FIG. 1 is a block diagram of an example computer environment for use in conjunction with one or more disclosed embodiments.

Embodiments herein describe a switchable redundant voltage regulator (referred to herein as a redundant voltage phase) that can be attached to multiple different loads. As mentioned above, multiple processors are being disposed in the same form factor (e.g., a processor or IO drawer). Each processor can have multiple voltage domains (also referred to as voltage levels). To provide sufficient current, multiple phases (or voltage regulators) may be coupled to each of the voltage domains (or levels). For example, a processor may have five voltage domains where each voltage domain is each powered using five phases. In that case, the computing system includes 25 phases for each processor in the system. As more and more processors are added, the number of phases also grows in tandem. This problem is compounded if the computing system provides redundancy (e.g., N+1 or N+2 redundancy). For N+1 redundancy, an additional 5 phases are included in the computing system (one for each of the five voltage domains). N+2 redundancy means 10 additional phases are included in the computing system (two for each of the five voltage domains). This quickly grows the space in the computing system used for redundant phases, displacing processors, memory, or other features, and the cost associated with the redundancy phases.

Instead of providing a redundant phase for every voltage domain in a computing system, the embodiments herein describe sharing redundant phases between voltage domains. That is, instead of connecting a redundant phase directly to a particular voltage domain, a redundant phase is coupled to a switch which selectively couples the redundant phase to any number of voltage domains. Thus, if a primary phase serving any one of the phase fails, the switch can be controlled to connect the redundant phase to the corresponding voltage domain. In this manner, the redundant phase is a shared phase for a plurality of voltage domains. The computing system can leverage these switchable redundant phase to provide N+1 or N+2 redundancy while using fewer redundant phases, which can advantageously reduce space and cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a power controller 200 which can switch in redundant phases to voltage domains that are connected to a failed phase. In addition to power controller 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and power controller 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in power controller 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
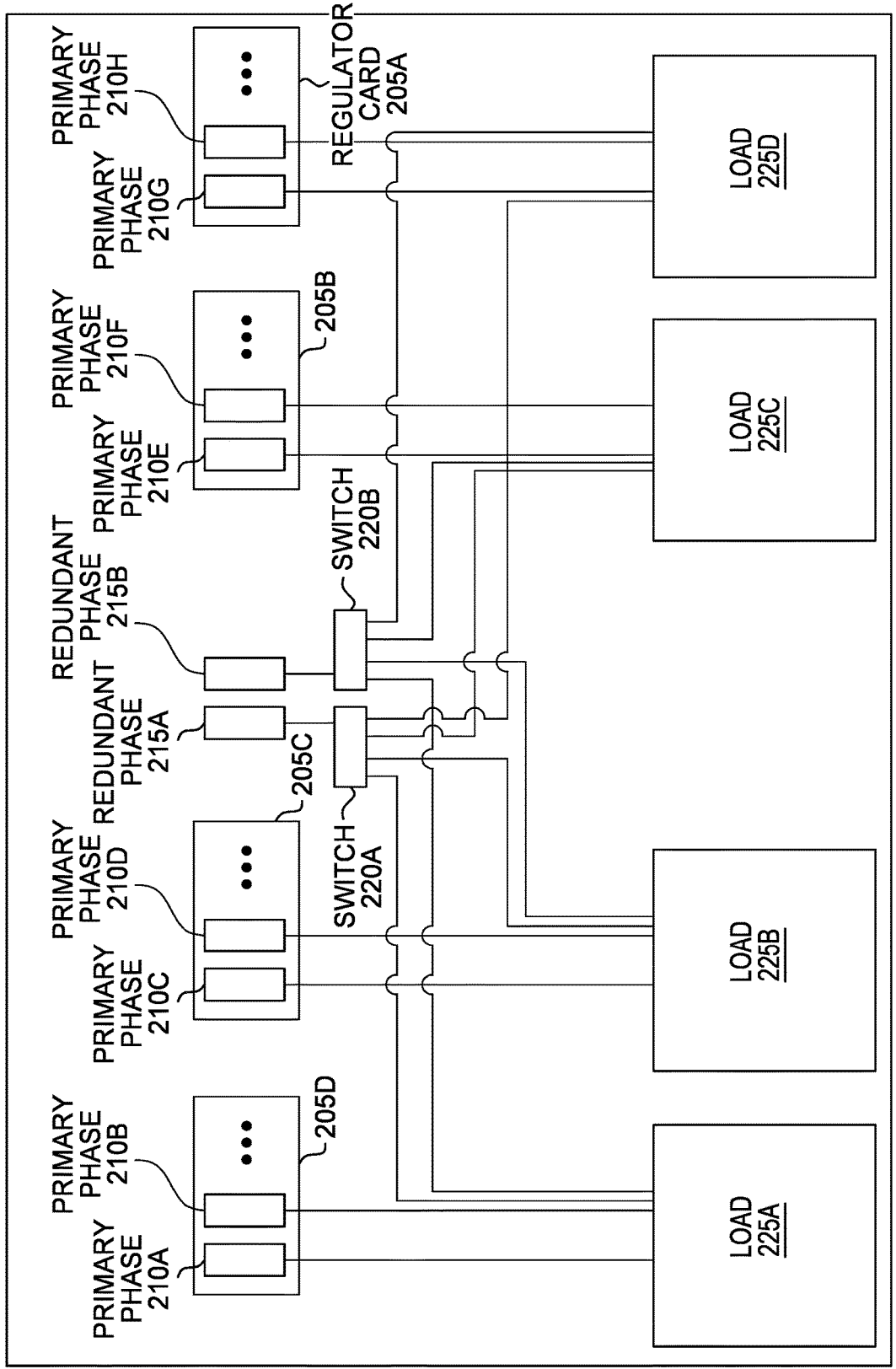
FIG. 2 is a block diagram of a computing system with switchable redundant phases, according to one embodiment described herein.

FIG. 2 is a block diagram of a computing system 201 with switchable redundant phases 215, according to one embodiment described herein. As shown, the computing system 201 includes a plurality of regulator cards 205A-D that is coupled to a plurality of loads 225. For example, the regulator cards 205 may be a printed circuit board (PCB). The loads 225 may be disposed on different cards (e.g., separate PCBs) or the loads 225 may be disposed on the same card (e.g., the same PCB). The loads 225 can be any computing device that is powered by a regulator card 205, such as integrated circuits, field programmable gate arrays, system on chips, processors, memory modules, accelerators, and the like.

The regulator cards 205 each includes a plurality of primary phases 210 (e.g., primary voltage regulators). The computer system 201 also includes a plurality of redundant phases 215 (e.g., redundant voltage regulators). The primary phases 210 are coupled to one of the respective loads 225. For example, the primary phases 210A and 210B provide power to the load 225A, the primary phases 210C and 210D provide power to the load 225B, the primary phases 210E and 210F provide power to the load 225C, and so forth. In this example, the primary phases 210 are hard wired to a respective one of the loads 225 so that the primary phases 210 supply power only to that load 225.

In one embodiment, the loads 225 can have any number of voltage domains (or voltage levels). For example, a processor may have e.g., 4 to 8 voltage domains. Multiple primary phases 210 may be assigned to each voltage domain. For instance, the primary phases 210A and 210B may establish just one voltage domain for the load 225A. Although not shown, the regulator cards 205 could include other primary phases that establish additional voltage domains for the load 225A. For easy of explanation, it is assumed that the primary phases 210 are used to establish one voltage domain for each of the loads 225, with the understanding that each load 225 may have multiple voltage domains that are each established using multiple primary phases.

Unlike the primary phases 210 which are hard-wired to a particular load 225, the redundant phases 215 are coupled to switches 220 that enable the redundant phases 215 to be selectively coupled to any one of the loads 225. That is, the output of the switches 220 are coupled to each of the loads 225A-225D. As such, the redundant phases 215 can be selectively coupled to any one of the loads 225 in case of failure with one (or both) of the primary phases 210. In this manner, the computing system 201 can support N+1 and N+2 redundancy without physically having one (or two) redundant phases 215 for each voltage domain of a load 225. For example, if the primary phase 210A fails, the switch 220A can couple the redundant phase 215A to the load 225A. Or if the primary phases 210A and 210B fail, the switches 220A and 220B can connect both redundant phase 215A and 215B to the load 225A. Thus, N+1 and N+2 (or greater) redundancy can be provided using fewer redundant phases 215. When there are no failures in the primary phases 210, the redundant phases 215 can be disconnected from the loads 225 and powered down to conserve energy.

In one embodiment, the switches 220 are implemented using multiplexers. In another embodiment, the switches 220 can be implemented with transistors or other logic gates that can selectively couple the redundant phases 215 to the loads 225.

In one embodiment, the components shown in FIG. 2 are implemented in the same computing device, such as within the form factor of an IO drawer or processor drawer. Because these drawers may have set dimensions due to an industry standard, the space inside is limited. The techniques herein can enable a designer to meet the space requirements of the device while still providing the desired level of redundancy.

Figure 3:
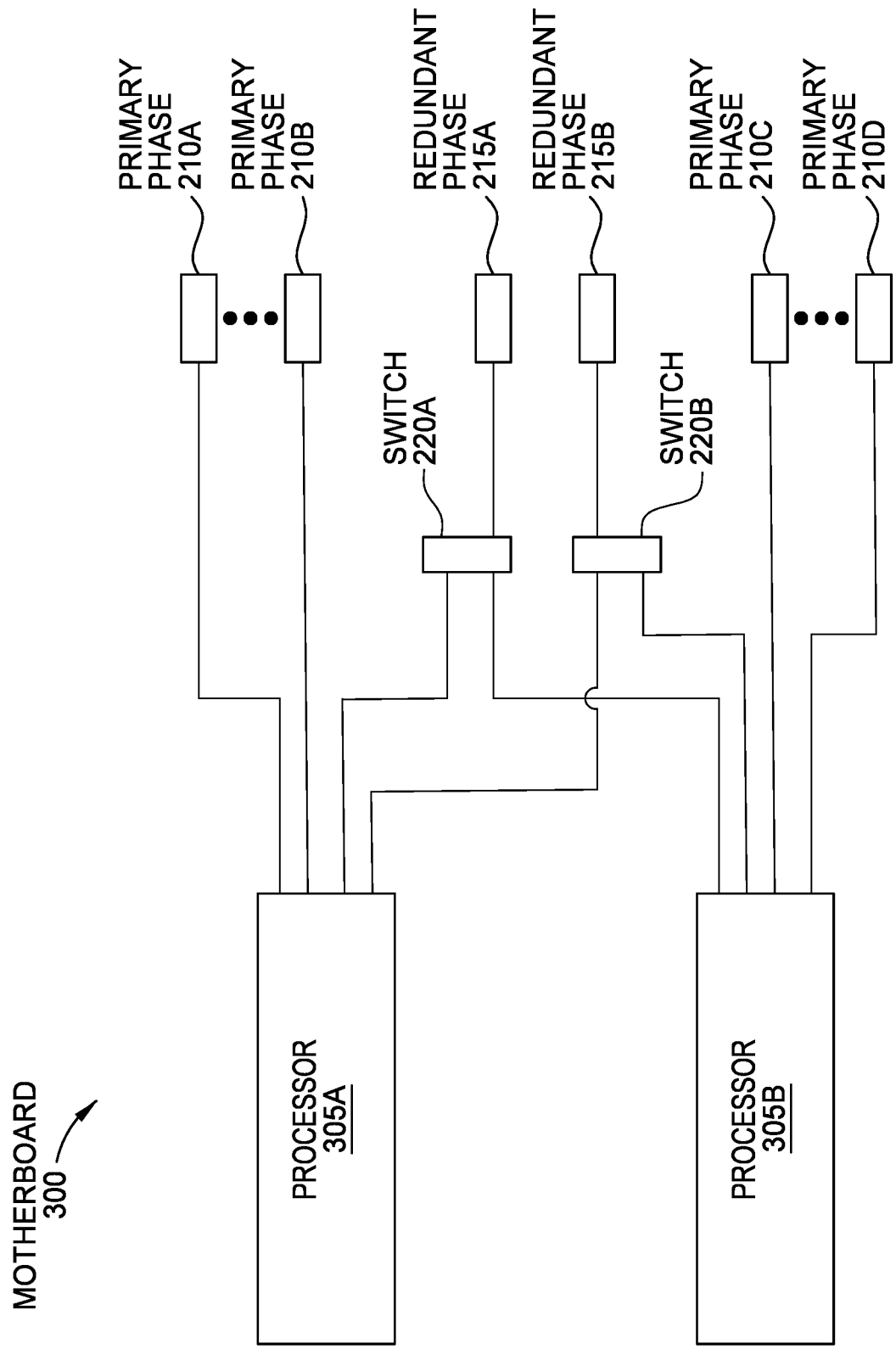
FIG. 3 is a block diagram of a motherboard with switchable redundant phases, according to one embodiment described herein.

FIG. 3 is a block diagram of a motherboard 300 with switchable redundant phases, according to one embodiment described herein. In FIG. 3, the motherboard 300 (e.g., a PCB or card) includes two processors 305A and 305B which are powered by two pairs of primary phases 210. The motherboard 300 also includes two redundant phases 215A and 215B which are selectively coupled to the processors 305 via the switches 220. Thus, whenever one (or two) of the primary phases 210, which could be on pluggable assemblies or embedded in the processor planar, fail, the switches 220 can connect a redundant phase to the corresponding processor 305 (e.g., a load) to replace the failed primary phase 210.

Thus, unlike in FIG. 2 where the phases and the loads are distributed on different cards, in FIG. 3 the phases 210, 215 are disposed on the same card (i.e., the motherboard 300) as the loads (the processors 305). Thus, the redundant phase schemes discussed herein can be applied to a computing system that includes a plurality of cards as shown in FIG. 2 or to a single card as shown in FIG. 3. In either case, N+1 and N+2 (or greater) redundancy can be provided using fewer redundant phases 215. When there are no failures in the primary phases 210, the redundant phases 215 can be disconnected from the processors 305 and powered down to conserve energy.

Figure 4:
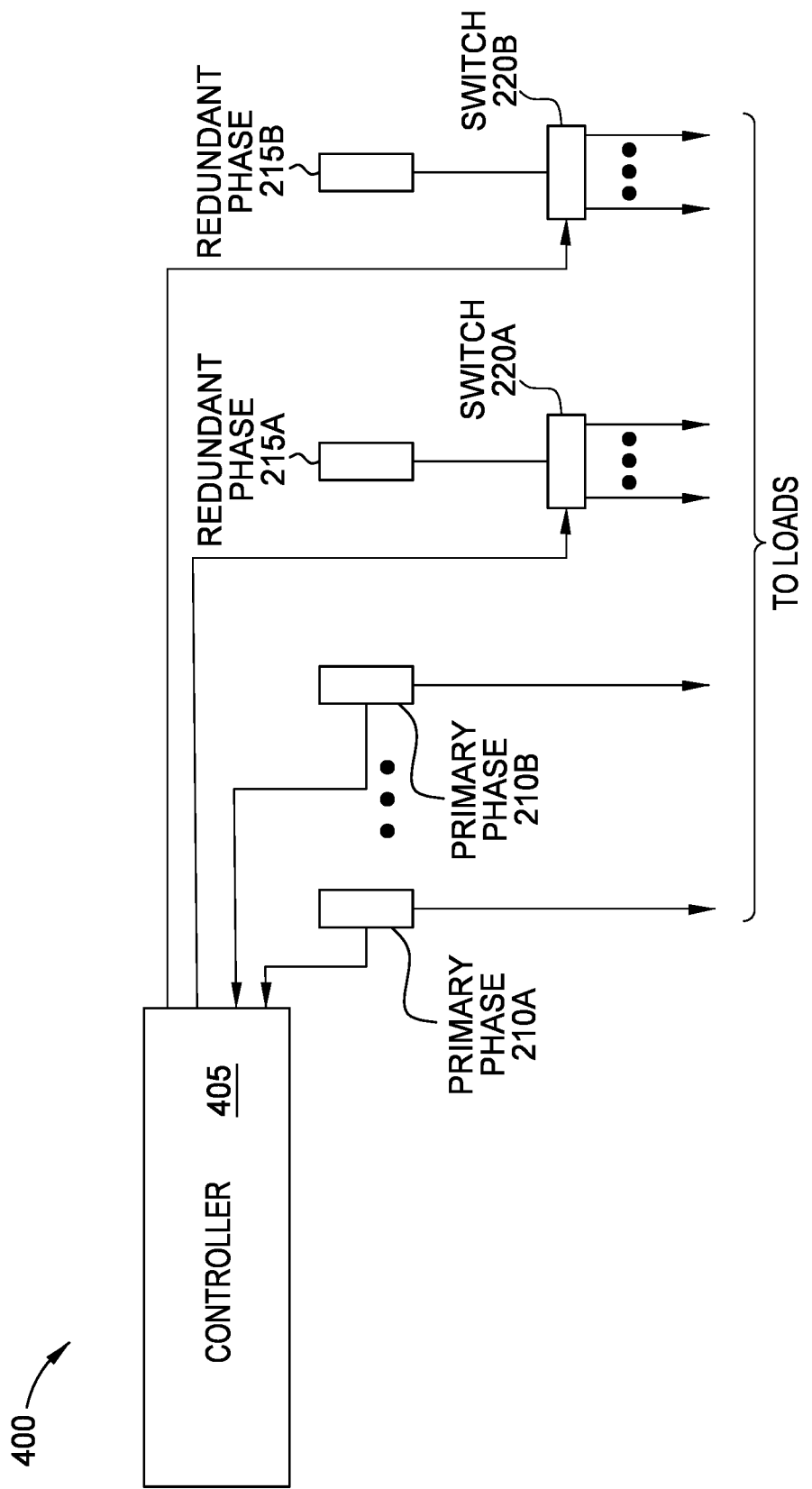
FIG. 4 is a block diagram of system for monitoring and controlling primary and redundant phases, according to one embodiment described herein.

FIG. 4 is a block diagram of control system 400 for monitoring and controlling primary and redundant phases, according to one embodiment described herein. As shown, the control system 400 includes a controller 405 that is coupled to the primary phases 210, the redundancy phases 215, and the switches 220. The controller 405 can be a processor (e.g., a microprocessor), an application specific integrated circuit (ASIC), a digital controller, an analog controller, and the like. The controller 405 can be disposed on the same card as the primary phases 210, the redundancy phases 215, and the switches 220, or can be disposed on a separate card. In one embodiment, the controller 405 can use the inter-integrated circuit (I2C) or the Serial Peripheral Interface (SPI) protocols to communicate with the primary phases 210 and the redundant phases 215.

The controller 405 can receive information regarding the operation of the primary phases 210 and the redundant phases 215. This information can include a status that informs the controller 405 whether the primary phase 210 has failed. The information can include other types of data such as the power output of the phases, temperatures, current, voltage, etc. The controller 405 can also track the primary phases 210 to know the loads they are assigned to, and the voltage domain of the load that is serviced by the primary phases 210. That way, when a primary phase 210 fails, the controller 405 knows which load and voltage domain a redundant phase 215 should be connected to.

In this example, the controller 405 controls the switches 220. For example, the switches 220 may be multiplexers where the controller 405 provides a select line to the multiplexers to connect the redundant phase to a particular load (or to a particular voltage domain of a load). When the controller 405 detects that one of the primary phases 210 has failed, the controller 405 can use one of the switches 220 to connect a redundant phase 215 to the voltage domain that was serviced by the failed primary phase 210.

Figure 5:
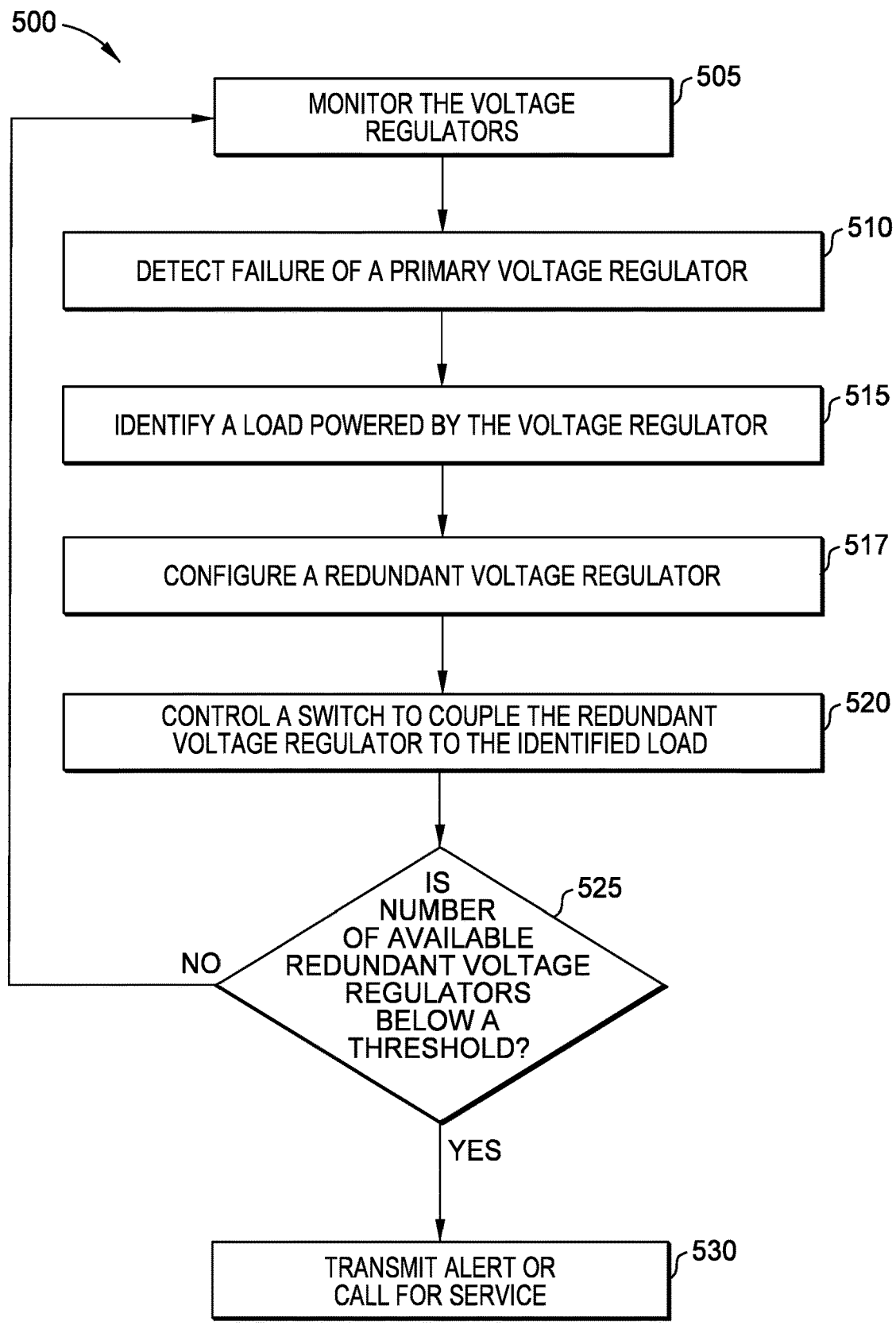
FIG. 5 is a flowchart for operating a redundant phase, according to one embodiment described herein.

FIG. 5 is a flowchart of a method 500 for operating a redundant phase, according to one embodiment described herein. At block 505, a controller (e.g., the controller 405 in FIG. 4 or the power controller 200 in FIG. 1) monitors the voltage regulators. For example, the controller can monitor information regarding the primary phases or primary voltage regulators to determine when one has failed (or is about to fail).

At block 510, the controller detects the failure of a primary voltage regulator. A failure can be a failure that has already happened or a failure that is predicted to happen imminently.

At block 515, the controller identifies a load powered by the failed voltage regulator. For example, the controller may use a lookup table to map an identification of each of the primary voltage regulators to a particular load (or a voltage domain). Or the voltage regulators may tell the controller the load or voltage domain they are connected to.

At block 517, the controller configures a redundancy voltage regulator that will replace the failed voltage regulator. That is, the redundant voltage regulator is configured according to the level it is being switch into.

At block 520, the controller controls a switch to couple the redundant voltage regulator to the identified load. As discussed above, the switch can be a multiplexer, transistor, set of transistors, or any other circuitry that can selectively couple a redundant phase to a plurality of different voltage domains. As such, the redundant voltage regulator is shared by a plurality of loads. Once one of those loads has a faulty voltage regulator, the redundant voltage regulator can be switched in to replace the faulty voltage regulator.

At block 525, the controller determines whether a number of available redundant voltage regulators is below a threshold. For example, a regulator card may include fifty primary voltage regulators and five redundant voltage regulators. The designer may want those five redundant voltage regulators to provide N+2 redundancy. If three of the primary voltage regulators fails, those three regulators are replaced by three of the redundant voltage regulators, meaning that only two of the redundant voltage regulators are not being used (i.e., are still available). If another voltage regulator fails, this means there is only one unused redundant voltage regulators. In that case, the system would no longer have N+2 redundancy. As such, the controller may send an alert or raise a flag when there are only two unused redundant voltage regulators since the next failure will mean that N+2 redundancy is no longer achievable. Thus, in this scenario, the threshold may be three.

Continuing this example, if N+1 redundancy is desired, then the threshold may be two. In that case, if there are two unused redundant voltage regulators, this means when there is another failure there will be only one unused redundant voltage regulator. Any additional failures mean the system can no longer provide N+1 redundancy.

If the number of available (i.e., unused) redundant voltage regulators is at or above the threshold, the method 500 returns to block 505 where the controller continues to monitor the voltage regulators to detect when another voltage regulator fails (e.g., either a primary voltage regulator or a redundant voltage regulator that is currently being used).

However, if the number of available (i.e., unused) redundant voltage regulators is below the threshold, the method 500 proceeds to block 530 where the controller transmits an alert. This alert can tell a system technician or administrator that they may want to replace the voltage regulator card. The technician may choose to replace the regulator card so that the desired level of redundancy is maintained in the computing system. For example, the regulator card may be a pluggable card.

These are just some examples of setting a threshold to determine when to alert a technician to replace the voltage regulator. In other examples, the threshold may be set higher to increase the likelihood the desired level of redundancy is not violated.

While the foregoing is directed to embodiments of the present invention, other and further embodiments of the invention may be devised without departing from the basic scope thereof, and the scope thereof is determined by the claims that follow.

What is claimed is:

1. A system comprising:
   a plurality of primary voltage regulators coupled to respective loads;
   a plurality of redundant voltage regulators coupled to respective switches, wherein each of the switches is coupled to a plurality of the respective loads; and
   a controller configured to:
   detect a failure of one of the plurality of primary voltage regulators;

identify a load powered by the failed voltage regulator; and control one of the respective switches to couple a corresponding one of the plurality of redundant voltage regulators to the identified load.

2. The system of claim 1, wherein the plurality of primary voltage regulators, the plurality of redundant voltage regulators, and the respective switches are disposed on a same card.

3. The system of claim 2, wherein the respective loads are disposed on one or more cards that are separate from the same card.

4. The system of claim 3, wherein the same card and the one or more cards are disposed in an input/output (IO) drawer.

5. The system of claim 2, wherein the respective loads are disposed on the same card as the plurality of primary voltage regulators, the plurality of redundant voltage regulators, and the respective switches.

6. The system of claim 3, wherein the respective loads are respective processors.

7. The system of claim 2, wherein the controller is configured to:
determine when a number of available redundant voltage regulators satisfies a threshold, and in response, transmit an alert to replace the same card.

8. The system of claim 1, wherein each of the plurality of primary voltage regulators is coupled to only one of the respective loads, wherein each of the plurality of redundant voltage regulators can be coupled to any one of the respective loads using the respective switches.

9. A method, comprising:
detecting a failure of one of a plurality of primary voltage regulators, wherein the plurality of primary voltage regulators are coupled to respective loads;
identifying a load powered by the failed voltage regulator; and
controlling, using a controller, a switch to couple a redundant voltage regulator to the identified load, wherein the switch is coupled to a plurality of the respective loads and is separate from the controller.

10. The method of claim 9, wherein the plurality of primary voltage regulators, the redundant voltage regulator, and the switch are disposed on a same card.

11. The method of claim 10, wherein load is disposed on a card that is separate from the same card.

12. The method of claim 9, further comprising:
detecting a failure of a second one of the plurality of primary voltage regulators;
identifying a second load powered by the second voltage regulator; and
controlling a second switch to couple a second redundant voltage regulator to the second load.

13. The method of claim 9, further comprising:
determining when a number of available redundant voltage regulators satisfies a threshold, and in response, transmitting an alert to replace a card containing the plurality of primary voltage regulators and a plurality of redundant voltage regulators.

14. A printed circuit board (PCB), comprising:
a plurality of primary voltage regulators configured to provide power to a plurality of loads;
a plurality of redundant voltage regulators coupled to respective switches, wherein each of the respective switches are configured to couple to the plurality of the loads; and
a controller configured to:
detect a failure of one of the plurality of primary voltage regulators;
identify a load powered by the failed voltage regulator; and
control one of the respective switches to couple a corresponding one of the plurality of redundant voltage to the identified load.

15. The PCB of claim 14, wherein the plurality of loads are not disposed on the PCB.

16. The PCB of claim 14, wherein the PCB is designed to be inserted into an IO drawer.

17. The PCB of claim 14, wherein the controller is configured to:
determine when a number of available redundant voltage regulators satisfies a threshold, and in response, transmit an alert to replace the PCB.

18. The PCB of claim 14, wherein each of the plurality of primary voltage regulators is configured to couple to only one of the plurality of loads, wherein each of the plurality of redundant voltage regulators can be coupled to any one of the plurality of loads using the respective switches.

19. The PCB of claim 18, wherein each of the plurality of redundant voltage regulators is coupled to a different one of the respective switches.

20. The PCB of claim 14, wherein the plurality of loads are disposed on the PCB, wherein the plurality of loads comprises processors.

* * * * *